(12) United States Patent
Gao

(10) Patent No.: US 11,757,577 B2
(45) Date of Patent: Sep. 12, 2023

(54) DATA TRANSMISSION METHOD, TERMINAL DEVICE, AND NETWORK DEVICE

(71) Applicant: CHINA ACADEMY OF TELECOMMUNICATIONS TECHNOLOGY, Beijing (CN)

(72) Inventor: Xuejuan Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 17/043,216

(22) PCT Filed: Jan. 31, 2019

(86) PCT No.: PCT/CN2019/074182
§ 371 (c)(1),
(2) Date: Sep. 29, 2020

(87) PCT Pub. No.: WO2019/184595
PCT Pub. Date: Oct. 3, 2019

(65) Prior Publication Data
US 2021/0021386 A1    Jan. 21, 2021

(30) Foreign Application Priority Data

Mar. 30, 2018  (CN) .................... 201810276542.X

(51) Int. Cl.
*H04L 1/1812* (2023.01)
*H04B 7/0456* (2017.01)
(Continued)

(52) U.S. Cl.
CPC ......... *H04L 1/1819* (2013.01); *H04B 7/0456* (2013.01); *H04L 1/1893* (2013.01); *H04L 5/0055* (2013.01); *H04W 72/0446* (2013.01)

(58) Field of Classification Search
CPC ... H04L 1/1819; H04L 5/0055; H04L 1/1893; H04L 1/18; H04L 5/00; H04L 1/16;
(Continued)

(56) References Cited

U.S. PATENT DOCUMENTS

2012/0307755 A1   12/2012  Kim et al.
2016/0211949 A1*  7/2016   You ....................... H04L 1/1861
(Continued)

FOREIGN PATENT DOCUMENTS

CN    101990242 A    3/2011
CN    107295585 A    10/2017
(Continued)

OTHER PUBLICATIONS

Catt, "Corrections on carrier aggregation and bandwidth part operation", 3GPP Tsg Ran WG1 Meeting #94, R1-1808381,Aug. 24, 2018.
(Continued)

*Primary Examiner* — Mang Hang Yeung
(74) *Attorney, Agent, or Firm* — HARNESS, DICKEY & PIERCE, P.L.C.

(57) ABSTRACT

A data transmission method, a terminal device, and a network device are provided. The data transmission method includes: receiving a PDSCH; and mapping HARQ-ACK feedback information corresponding to a PDSCH with repetition transmissions at least to a first transmission position for transmission, where the first transmission position is a position corresponding to a last transmission of the repetition transmissions of the PDSCH in a semi-static HARQ-ACK codebook.

8 Claims, 11 Drawing Sheets

(51) Int. Cl.
*H04L 1/1867* (2023.01)
*H04L 5/00* (2006.01)
*H04W 72/0446* (2023.01)

(58) Field of Classification Search
CPC ... H04L 1/1812; H04L 1/1858; H04L 1/1607; H04W 72/0446; H04W 72/04; H04W 72/1273; H04B 7/0456
USPC .......................................................... 370/329
See application file for complete search history.

(56) References Cited

U.S. PATENT DOCUMENTS

| | | | |
|---|---|---|---|
| 2017/0134124 A1* | 5/2017 | Lee | H04L 1/08 |
| 2017/0134140 A1* | 5/2017 | Park | H04L 1/0046 |
| 2017/0353272 A1* | 12/2017 | Takeda | H04L 1/1864 |
| 2018/0376498 A1* | 12/2018 | Bhattad | H04L 1/1864 |
| 2019/0036654 A1* | 1/2019 | Kim | H04L 1/1607 |
| 2019/0045489 A1* | 2/2019 | He | H04W 72/12 |
| 2019/0053036 A1 | 2/2019 | Liu | |
| 2019/0159251 A1* | 5/2019 | Li | H04L 1/1896 |
| 2019/0253204 A1* | 8/2019 | Takeda | H04W 28/04 |
| 2019/0356430 A1* | 11/2019 | Cheng | H04L 1/1864 |
| 2019/0363840 A1* | 11/2019 | Wang | H04L 1/1861 |
| 2020/0077470 A1* | 3/2020 | Xiong | H04L 1/1854 |
| 2020/0163126 A1* | 5/2020 | Yang | H04L 5/0044 |
| 2021/0014008 A1* | 1/2021 | Takeda | H04W 72/042 |

FOREIGN PATENT DOCUMENTS

| | | |
|---|---|---|
| CN | 107332646 A | 11/2017 |
| JP | 2013-511937 A | 4/2013 |
| WO | WO-201 6/072257 A1 | 5/2016 |
| WO | WO-2017078454 A1 | 5/2017 |
| WO | WO-2018/030379 A1 | 2/2018 |

OTHER PUBLICATIONS

Huawei et al. "Summary of remaining issues on CBG-based (re)transmission", 3GPP Tsg RANWG1 Ad Hoc Meeting, Ri-1800075, Jan. 13, 2018.
Nokia et al., "On remaining details of HARQ procedure", 3GPP Tsg Ran WG1 Meeting 91, R1 -1720480, Nov. 17, 2018.
Chinese Office Action for Chicnese Application No. 201810276542.X dated Feb. 2010.
Taiwan Office Action for Taiwanese Application No. 108104923 dated Dec. 31, 2019.
International Search Report for International Application No. PCT/CN2018/074182 dated Apr. 19, 2019.
Written Opinion of the International Searching Authority for International Application No. PCT/CN2018/074182 dated Apr. 19, 2019.
Huawei et al.. "Discussion on Sps Harq-Ack bit handling in case of dynamic codebook configuration for eCA ", 3GPP Tsg Ran WG1 Meeting #84bis, R1- 162105, Apr. 15, 2016.
3GPP,"3rd Generation Partnership Project", Dec. 2017.
Oppo, "Remaining Details On HARQ-ACK Transmission" 3GPP Tsg Ran WG1 Meeting #92, R1 -1802108, Mar. 2, 2019.
Catt, "Remaining issues on Nr Harq timing", Agenda Item 7.1.3.3.2, 3GPP Tsg Ran WG1 Meeting #92bis, R1-1803758, Sanya, China, Apr. 16-20, 2018.
Ntt Docomo, Inc.. "Dl/Ul scheduling and HARQ management", Agenda Item 7.3.3.2, 3GPP TSG Ran WG1 Meeting 90bis, R1-1718217, Prague, CZ, Oct. 9-13, 2017.
Extended European Search Report dated Apr. 22, 2021 for EP Application No. 19775205.8.
Japanese Office Action issued on Nov. 2, 2021 for Japanese Patent Application No. 2020-552707.

* cited by examiner

DATA TRANSMISSION METHOD, TERMINAL DEVICE, AND NETWORK DEVICE

CROSS-REFERENCE TO RELATED APPLICATION

The present application is a U.S. national phase application of a PCT Application No. PCT/CN2019/074182 filed on Jan. 31, 2019, which claims a priority to Chinese Patent Application No. 201810276542.X filed in China on Mar. 30, 2018, disclosure of which are incorporated in their entirety by reference herein.

TECHNICAL FIELD

The present disclosure relates to the field of telecommunication technology, in particular to a data transmission method, a terminal device, and a network device.

BACKGROUND

With the development and change of requirements of mobile communication services, organizations such as the International Telecommunication Union (ITU) and the Third Generation Partnership Project (3GPP) have started to research new wireless communication systems (for example, the Fifth Generation New Radio (5G NR)).

A flexible timing relationship is supported in a 5G NR system in the related art. For a physical downlink shared channel (PDSCH), a physical downlink control channel (PDCCH) carrying scheduling information for the PDSCH may indicate a scheduling timing relationship between the PDSCH and the PDCCH and a hybrid automatic repeat request acknowledgement (HARQ-ACK) timing relationship between the PDSCH and a HARQ-ACK corresponding to the PDSCH. Specifically, a time domain resource allocation indicator field in a downlink control information (DCI) format used by the PDCCH indicates a slot offset K0 between a slot in which the PDSCH is located and a slot in which DCI is located. A PDSCH-to-HARQ-ACK timing indicator field in the DCI format indicates a quantity K1 of slots between the PDSCH and the HARQ-ACK. DCI for scheduling the PDSCH has two formats, namely, a DCI format 1_0 and a DCI format 1_1. The DCI format 1_0 is a fallback DCI format. A K1 set corresponding to the fallback DCI format is constantly {1, 2, 3, 4, 5, 6, 7, 8}. The DCI format 1_1 is a non-fallback DCI format. A K1 set corresponding to the non-fallback DCI format includes at most eight values selected from the largest K1 set, and needs to include at least values in {0, 1, 2, 3, 4, 5, 6, 7}. A value of K1 may be indicated to a terminal device by using a 3-bit HARQ-ACK timing indicator field in the DCI. Therefore, the value may be changed dynamically.

Both semi-static configuration of HARQ-ACK codebook and dynamic configuration of HARQ-ACK codebook are supported in 5G NR systems. The so-called HARQ-ACK codebook refers to a HARQ-ACK feedback sequence generated for downlink transmission (including a PDSCH and a PDCCH for indicating downlink semi-persistent scheduling (SPS) resource release, where the PDCCH for indicating downlink SPS resource release may also be referred to as an SPS PDSCH release indication) for which HARQ-ACK feedbacks occur at the same time domain position or over the same uplink channel.

With a semi-static HARQ-ACK codebook configuration, a position set Mc of downlink transmission on each carrier c that corresponds to HARQ-ACK feedbacks performed in a same slot n may be determined according to HARQ-ACK timing values in a K1 set, and then a HARQ-ACK codebook transmitted in the slot n may be determined according to Mc. Specifically, according to each K1 value, a slot for which a HARQ-ACK feedback is performed in the corresponding slot n may be determined. For each of these slots, a maximum quantity of time division multiplexed (TDM) downlink transmission in the slot may further be determined according to various time domain positions in preconfigured downlink time domain resource allocation information. For example, if a semi-static uplink and downlink slot structure is configured and an uplink symbol exists at a transmission position in a slot that is determined according to downlink time domain resource allocation information, the transmission position is not counted. Therefore, a resource contention between uplink and downlink transmission occurs, and the downlink transmission does not occur in reality. Optionally, if a PDCCH monitoring occasion does not exist in a slot, determined according to a scheduling timing K0, used for transmitting scheduling information for downlink transmission in a slot, it is indicated that the downlink transmission slot cannot be scheduled, and downlink transmission in the slot cannot be counted. Downlink transmission may only exist in a slot on the condition that symbols in the slot that are determined according to downlink time domain resource allocation information are all downlink or unknown symbols and a slot used for transmitting scheduling information and corresponding to the slot in which symbols are all downlink or unknown symbols has a PDCCH monitoring occasion. Thereby, the maximum quantity of TDM downlink transmission is determined from downlink transmission that may exist in a slot. Consequently, a total quantity of downlink transmission in a plurality of slots that are obtained according to K1 and correspond to HARQ-ACK feedbacks performed in the slot n is determined as Mc. A semi-static HARQ-ACK codebook, including a codebook size and the specific content and sequence of HARQ-ACKs, transmitted in the slot n is determined according to Mc.

In 5G NR systems, when a PDSCH is repetitively transmitted, two, four or eight repeated PDSCH transmission is supported. Transmission of corresponding HARQ-ACK feedback information by using a semi-static HARQ-ACK codebook may be supported. However, there is no specific method for transmitting corresponding HARQ-ACK feedback information.

SUMMARY

The present disclosure provides in some embodiments a data transmission method, a terminal device, and a network device, so as to specify how to transmit corresponding HARQ-ACK feedback information during repeated transmission of a PDSCH, to ensure normal HARQ-ACK feedback for repeated PDSCH transmission.

In a first aspect, the present disclosure provides in some embodiments a data transmission method, applied to a terminal device, including:

receiving a PDSCH; and mapping HARQ-ACK feedback information corresponding to a PDSCH with repetition transmissions at least to a first target transmission position for transmission, where the first target transmission position is a position corresponding to a last transmission of the repetition transmissions of the PDSCH in a semi-static HARQ-ACK codebook.

In a second aspect, the present disclosure further provides in some embodiments a data transmission method, applied to a network device, including:

transmitting a PDSCH; and receiving HARQ-ACK feedback information corresponding to a PDSCH with repetition transmissions at least at a first target transmission position, where the first target transmission position is a position corresponding to a last transmission of the repetition transmissions of the PDSCH in a semi-static HARQ-ACK codebook.

In a third aspect, the present disclosure further provides in some embodiments a terminal device, including a transceiver, a storage, a processor, and a computer program stored in the storage and configured to be executed by the processor, where the transceiver is configured to: receive a PDSCH, and map HARQ-ACK feedback information corresponding to a PDSCH with repetition transmissions at least to a first target transmission position for transmission, where the first target transmission position is a position corresponding to a last transmission of the repetition transmissions of the PDSCH in a semi-static HARQ-ACK codebook.

In a fourth aspect, the present disclosure further provides in some embodiments a network device, including a transceiver, a storage, a processor, and a computer program stored in the storage and configured to be executed by the processor, where the transceiver is configured to: transmit a PDSCH, and receive HARQ-ACK feedback information corresponding to a PDSCH with repetition transmissions at least at a first target transmission position, where the first target transmission position is a position corresponding to a last transmission of the repetition transmissions of the PDSCH in a semi-static HARQ-ACK codebook.

In a fifth aspect, the present disclosure further provides in some embodiments a data transmission apparatus, applied to a terminal device, including:

a first receiving module, configured to receive a PDSCH; and a first transmission module, configured to map HARQ-ACK feedback information corresponding to a PDSCH with repetition transmissions at least to a first target transmission position for transmission, where the first target transmission position is a position corresponding to a last transmission of the repetition transmissions of the PDSCH in a semi-static HARQ-ACK codebook.

In a sixth aspect, the present disclosure further provides in some embodiments a data transmission apparatus, applied to a network device, including:

a second transmission module, configured to transmit a PDSCH; and a second receiving module, configured to receive HARQ-ACK feedback information corresponding to a PDSCH with repetition transmissions at least at a first target transmission position, where the first target transmission position is a position corresponding to a last transmission of the repetition transmissions of the PDSCH in a semi-static HARQ-ACK codebook.

In a seventh aspect, the present disclosure further provides in some embodiments a terminal device, including a storage, a processor, and a computer program stored in the storage and configured to be executed by the processor, where the processor is configured to execute the computer program to implement the steps in the foregoing data transmission method applied to a terminal device.

In an eighth aspect, the present disclosure further provides in some embodiments a network device, including a storage, a processor, and a computer program stored in the storage and configured to be executed by the processor, where the processor is configured to execute the computer program to implement the steps in the foregoing data transmission method applied to a network device.

In a ninth aspect, the present disclosure further provides in some embodiments a computer-readable storage medium storing therein a computer program, where the computer program is configured to be executed by a processor to implement the steps in the foregoing data transmission method applied to a terminal device, or implement the steps in the foregoing data transmission method applied to a network device.

In the embodiments of the present disclosure, a PDSCH is received, and HARQ-ACK feedback information corresponding to a PDSCH with repetition transmissions is mapped at least to a first transmission position for transmission, where the first transmission position is a position corresponding to a last transmission of the repetition transmissions of the PDSCH in a semi-static HARQ-ACK codebook, so that it can be specified how to transmit corresponding HARQ-ACK feedback information during repeated transmission of a PDSCH, to ensure normal HARQ-ACK feedback for repeated PDSCH transmission.

BRIEF DESCRIPTION OF THE DRAWINGS

To describe the technical solutions of the embodiments of the present disclosure more clearly, the following briefly describes the accompanying drawings required for describing the embodiments of the present disclosure. Apparently, the accompanying drawings in the following description show only some embodiments of the present disclosure, and a person of ordinary skill in the art may still derive other drawings from these accompanying drawings without creative efforts.

DETAILED DESCRIPTION

The following clearly and completely describes the technical solutions in the embodiments of the present disclosure with reference to the accompanying drawings in the embodiments of the present disclosure. Apparently, the described embodiments are only some embodiments of the present disclosure rather than all the embodiments. All other embodiments obtained by a person of ordinary skill in the art based on the embodiments of the present disclosure without creative efforts fall within the scope of the present disclosure.

Figure 1:
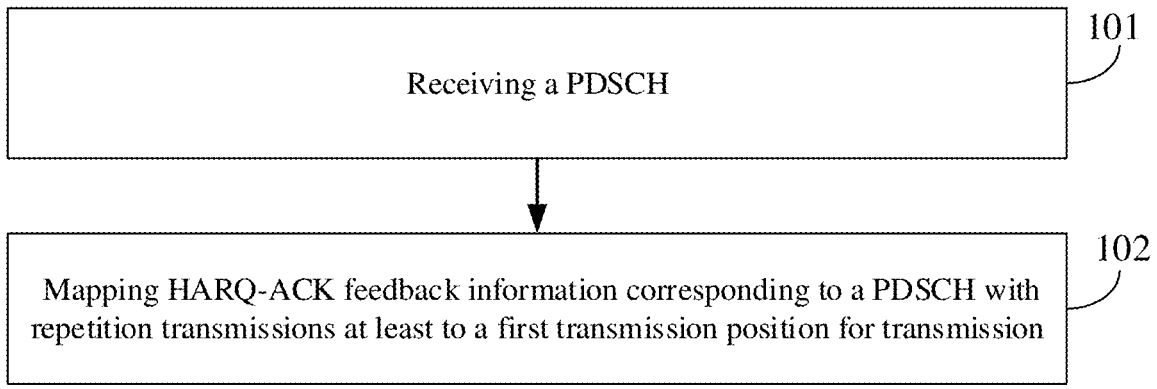
FIG. 1 is a flowchart of a data transmission method according to an embodiment of the present disclosure.

Referring to FIG. 1, the present disclosure provides in some embodiments a data transmission method. The method is applied to a terminal device, and includes the following steps.

A step 101 includes: receiving a PDSCH.

A step 102 includes: mapping HARQ-ACK feedback information corresponding to a PDSCH with repetition transmissions at least to a first transmission position for transmission.

The first transmission position is a position corresponding to a last transmission of the repetition transmissions of the PDSCH in a semi-static HARQ-ACK codebook.

The HARQ-ACK feedback information corresponding to a PDSCH with repetition transmissions is HARQ-ACK feedback information corresponding to the last transmission of the repetition transmissions of the PDSCH, i.e., the HARQ-ACK feedback information for the PDSCH resulting from combining multiple repeated transmission.

Further, the terminal device may map negative acknowledgement (NACK) information to a position other than a position corresponding to each transmission of the repetition transmissions of the PDSCH in the semi-static HARQ-ACK codebook for transmission.

In the data transmission method in the embodiment of the present disclosure, a PDSCH is received, and HARQ-ACK feedback information corresponding to a PDSCH with repetition transmissions is mapped at least to a first transmission position for transmission, where the first transmission position is a position corresponding to a last transmission of the repetition transmissions of the PDSCH in a semi-static HARQ-ACK codebook, so that it can be specified how to transmit corresponding HARQ-ACK feedback information during repeated transmission of a PDSCH, to ensure normal HARQ-ACK feedback for repeated PDSCH transmission.

In the embodiment of the present disclosure, a process in which the terminal device maps the HARQ-ACK feedback information corresponding to a PDSCH with repetition transmissions at least to the first transmission position for transmission may be implemented in the following three manners, which are separately described below.

The First Manner

In the first manner, the step 102 may include:

mapping, by the terminal device, the HARQ-ACK feedback information corresponding to a PDSCH with repetition transmissions to the first transmission position for transmission, and mapping NACK information to a second transmission position for transmission.

The second transmission position is a position corresponding to each transmission of the repetition transmissions of the PDSCH other than the last transmission of the repetition transmissions of the PDSCH in the semi-static HARQ-ACK codebook.

The Second Manner

In the second manner, the step 102 may include:

mapping, by the terminal device, the HARQ-ACK feedback information corresponding to a PDSCH with repetition transmissions to the first transmission position for transmission, and mapping HARQ-ACK feedback information corresponding to a current transmission of the repetition transmissions of the PDSCH (that is, the HARQ-ACK feedback information for the PDSCH resulting from combining the current transmission and previous repeated transmission) to a third transmission position for transmission.

The third transmission position is a position corresponding to the current transmission of the repetition transmissions of the PDSCH in the semi-static HARQ-ACK codebook.

The Third Manner

In the third manner, the step 102 may include:

repetitively mapping, by the terminal device, the HARQ-ACK feedback information corresponding to a PDSCH with repetition transmissions to a position corresponding to each transmission of the repetition transmissions of the PDSCH in the semi-static HARQ-ACK codebook for transmission.

That is, in this manner, the terminal device may map the HARQ-ACK feedback information corresponding to a PDSCH with repetition transmissions to the position corresponding to a last transmission of the repetition transmissions of the PDSCH in the semi-static HARQ-ACK codebook for transmission, and also map the HARQ-ACK feedback information to a position corresponding to each transmission of the repetition transmissions of the PDSCH other than the last transmission of the repetition transmissions of the PDSCH in the semi-static HARQ-ACK codebook for transmission. That is, the HARQ-ACK feedback information is repetitively transmitted at positions in the semi-static HARQ-ACK codebook that correspond to all of the repetition transmissions of the PDSCH.

The following can be known by comparing the foregoing three manners.

Compared with the first manner and the third manner, the benefit of the second manner lies in that: a PDSCH reception status as of each repeated transmission may be informed, to help a network side, such as a base station, to determine whether a quantity of repeated transmission of a PDSCH may further be adjusted. For example, after HARQ-ACK feedbacks have been performed multiple times, if ACK feedback can always be obtained within two transmission of a PDSCH despite the fact that the quantity of repeated transmission being configured to 4, it may be considered to change the quantity of repeated transmission of a PDSCH from 4 to 2.

Compared with the first manner and the second manner, the benefit of the third manner lies in that: by transmitting the same piece of HARQ-ACK feedback information repetitively, the reliability of transmitting a final HARQ-ACK corresponding to a PDSCH with repetition transmissions may be improved.

Figure 2:
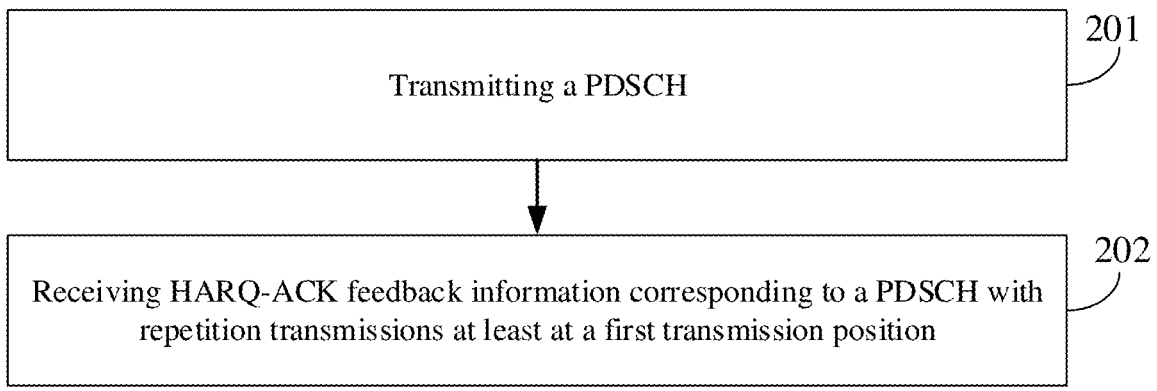
FIG. 2 is another flowchart of a data transmission method according to an embodiment of the present disclosure.

Referring to FIG. 2, the present disclosure provides in some embodiments a data transmission method. The method is applied to a network device, and includes the following steps.

A step 201 includes: transmitting a PDSCH.

A step 202 includes: receiving HARQ-ACK feedback information corresponding to a PDSCH with repetition transmissions at least at a first transmission position.

The first transmission position is a position corresponding to a last transmission of the repetition transmissions of the PDSCH in a semi-static HARQ-ACK codebook.

In the data transmission method in the embodiment of the present disclosure, a PDSCH is transmitted, and HARQ-ACK feedback information corresponding to a PDSCH with repetition transmissions is received at least at a first transmission position, where the first transmission position is a position corresponding to a last transmission of the repetition transmissions of the PDSCH in a semi-static HARQ-ACK codebook, so that it can be specified how to transmit corresponding HARQ-ACK feedback information during repeated transmission of a PDSCH, to ensure normal HARQ-ACK feedback for repeated PDSCH transmission, to obtain correct feedback information.

In some embodiments of the present disclosure, optionally, the step 202 may include:

receiving the HARQ-ACK feedback information corresponding to a PDSCH with repetition transmissions at the first transmission position, and receiving NACK information at a second transmission position, where the second transmission position is a position corresponding to each transmission of the repetition transmissions of the PDSCH other than the last transmission of the repetition transmissions of the PDSCH in the semi-static HARQ-ACK codebook.

Optionally, the step 202 may include:

receiving the HARQ-ACK feedback information corresponding to a PDSCH with repetition transmissions at the first transmission position, and receiving HARQ-ACK feedback information corresponding to a current transmission of the repetition transmissions of the PDSCH at a third transmission position, where the third transmission position is a position corresponding to the current transmission of the repetition transmissions of the PDSCH in the semi-static HARQ-ACK codebook.

Optionally, the step 202 may include:

receiving the HARQ-ACK feedback information corresponding to a PDSCH with repetition transmissions at a position corresponding to each transmission of the repetition transmissions of the PDSCH in the semi-static HARQ-ACK codebook.

Optionally, the HARQ-ACK feedback information corresponding to a PDSCH with repetition transmissions is HARQ-ACK feedback information corresponding to the last transmission of the repetition transmissions of the PDSCH.

Optionally, the method further includes:

receiving NACK information at a position other than a position corresponding to each transmission of the repetition transmissions of the PDSCH in the semi-static HARQ-ACK codebook.

A specific embodiment of the present disclosure is described below in detail with reference to FIG. 3 to FIG. 9.

Figure 3:
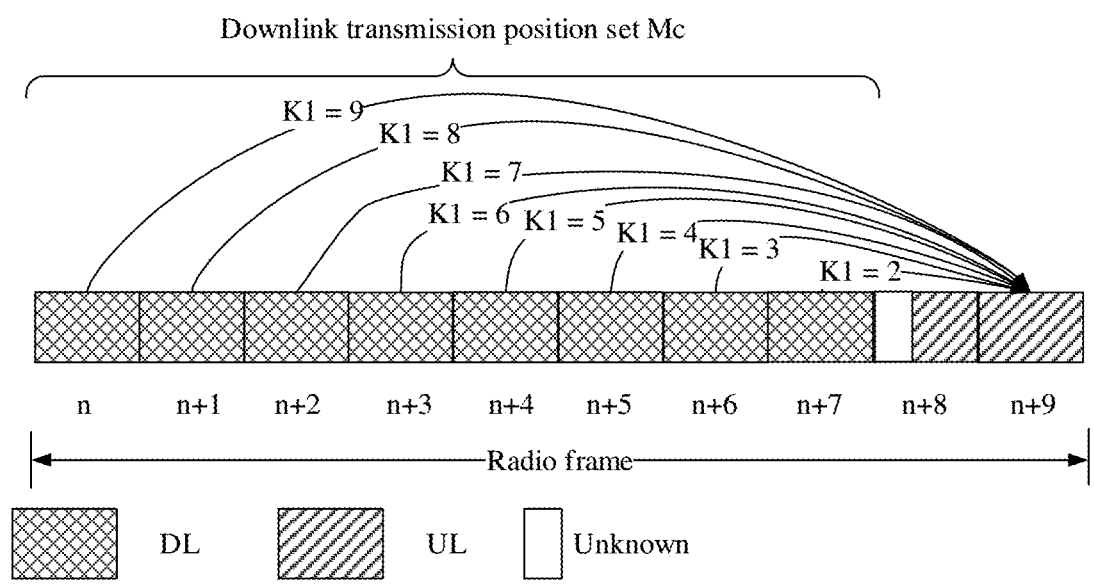
FIG. 3 is a schematic diagram of downlink transmission positions according to a specific embodiment of the present disclosure.

In a specific embodiment of the present disclosure, referring to FIG. 3, assuming that a candidate set K1 including eight HARQ-ACK timings is {0, 1, 2, 3, 4, 5, 6, 7, 8, 9}, 10 slots corresponding to the HARQ-ACK transmission performed in a slot n+9 may be determined. The slot n+9 and a slot n+8 are uplink slots which cannot be used to perform downlink transmission, and are therefore excluded from the feedback of the semi-static HARQ-ACK codebook. Only a slot n to a slot n+7 remain in the feedback of the semi-static HARQ-ACK codebook. For each of these slots, a maximum quantity of PDSCHs that may exist in the slot is determined in a related manner in the related art. For example, in this case, it is assumed that a terminal capability only supports one PDSCH for each slot, and each slot has a corresponding PDCCH monitoring occasion in a slot determined according to K0 and used for transmitting scheduling signaling, then it is determined that each slot may include one PDSCH transmission. That is, a quantity of downlink transmission on a current carrier c that corresponds to the HARQ-ACK feedback performed in the slot n+9 is Mc=8. Each PDSCH corresponds to one of the Mc positions. The correspondence is determined at the same time as the process of determining the quantity of downlink transmission. The repeated transmission of a PDSCH may be preconfigured by higher layer signaling. A quantity of repeated transmission is A. That is, a PDSCH carrying the same transport block (TB) needs to be repetitively transmitted A times. If repeated transmission is performed in units of slot, each transmission is performed in one slot including sufficient downlink or unknown symbols, and a slot in which a first PDSCH transmission occurs is determined according to the scheduling of a PDCCH, for example, may be determined according to K0. A time domain resource of a PDSCH in one slot is determined according to the scheduling of a PDCCH. In addition, during repeated transmission, each PDSCH has the same time domain position in the transmission slots. Repeated transmission is performed in a slot which is subsequent to the first slot and satisfies the aforementioned slot time domain resource allocation requirement of a PDSCH. Certainly, it is not excluded that, during specific implementation, repeated transmission may further be performed within a slot, for example, when a relatively small quantity of symbols are allocated to one PDSCH. However, in specific embodiments of the present disclosure, repeated transmission is only performed in units of slot.

The first case: it is assumed that the quantity of repeated transmission of a PDSCH is 4, the first PDSCH is transmitted in a slot n for the first time and is repetitively transmitted in subsequent slots n+1, n+2, and n+3 sequentially, and a second PDSCH is transmitted in a slot n+4 for the first time and is repetitively transmitted in subsequent slots n+5, n+6, and n+7 sequentially. The terminal device may perform corresponding HARQ-ACK feedbacks in the following manners.

Figure 4:
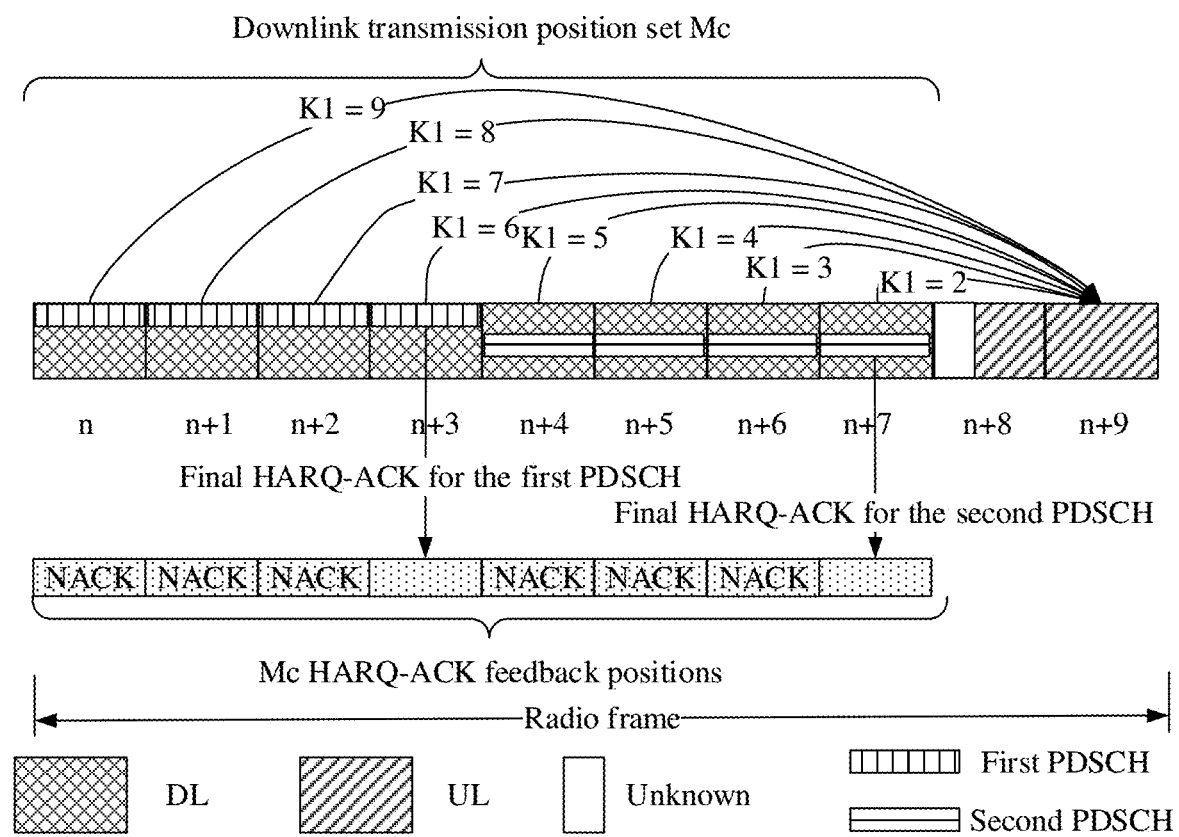
FIG. 4 is a schematic diagram of performing HARQ-ACK feedback in the first manner in the first case according to a specific embodiment of the present disclosure.

The first manner: as shown in FIG. 4, the terminal device may map final HARQ-ACK feedback information for the first PDSCH transmitted repetitively for four times to a position corresponding to the last transmission of the PDSCH in the semi-static HARQ-ACK codebook, that is, the final HARQ-ACK feedback information is transmitted at a HARQ-ACK position corresponding to a slot n+3 in the semi-static HARQ-ACK codebook. The terminal device may map final HARQ-ACK feedback information for the second PDSCH transmitted repetitively for four times to a position corresponding to the last transmission of the PDSCH in the semi-static HARQ-ACK codebook, that is, the final HARQ-ACK feedback information is transmitted at a HARQ-ACK position corresponding to a slot n+7 in the semi-static HARQ-ACK codebook. The terminal device directly maps NACK information to a position corresponding to other downlink transmission in the semi-static HARQ-ACK codebook.

Figure 5:
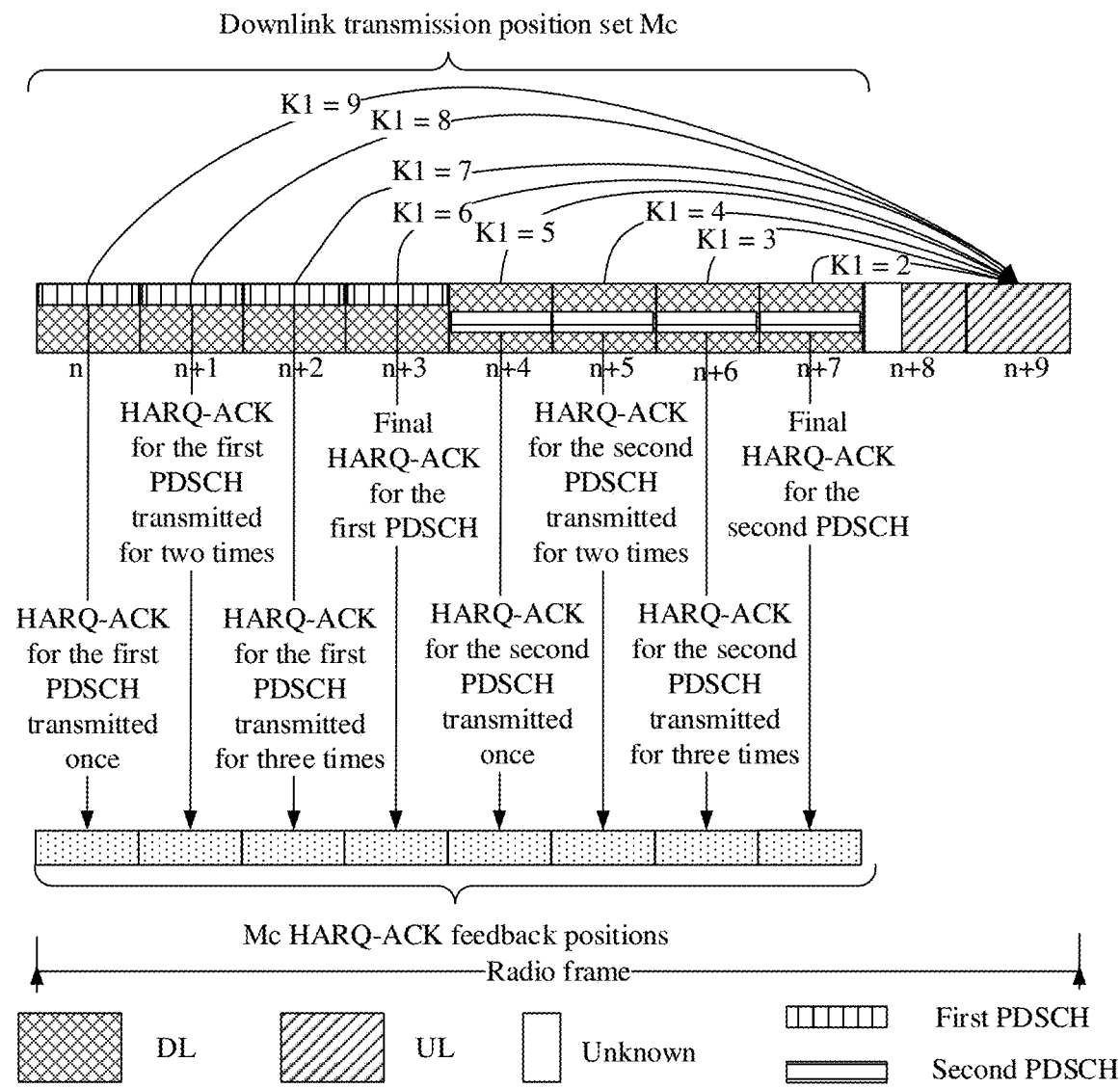
FIG. 5 is a schematic diagram of performing HARQ-ACK feedback in the second manner in the first case according to a specific embodiment of the present disclosure.

The second manner: as shown in FIG. 5, the terminal device may map final HARQ-ACK feedback information for the first PDSCH transmitted repetitively for four times to a position corresponding to the last transmission of the PDSCH in the semi-static HARQ-ACK codebook, that is, the final HARQ-ACK feedback information is transmitted at a HARQ-ACK position corresponding to a slot n+3 in the semi-static HARQ-ACK codebook. The terminal device may map the HARQ-ACK feedback information for downlink transmission other than the last transmission of the first PDSCH to a position corresponding to the downlink transmission in the semi-static HARQ-ACK codebook, that is, HARQ-ACK feedback information for the first PDSCH transmitted repetitively for three times is mapped to a position corresponding to a slot n+2 in the semi-static HARQ-ACK codebook, HARQ-ACK feedback information for the first PDSCH transmitted repetitively for two times is mapped to a position corresponding to a slot n+1 in the semi-static HARQ-ACK codebook, and HARQ-ACK feedback information for the first PDSCH transmitted for the first time is mapped to a position corresponding to a slot n in the semi-static HARQ-ACK codebook. HARQ-ACK feedbacks for the second PDSCH is similar to HARQ-ACK feedbacks for the first PDSCH. Details are not described herein again.

Figure 6:
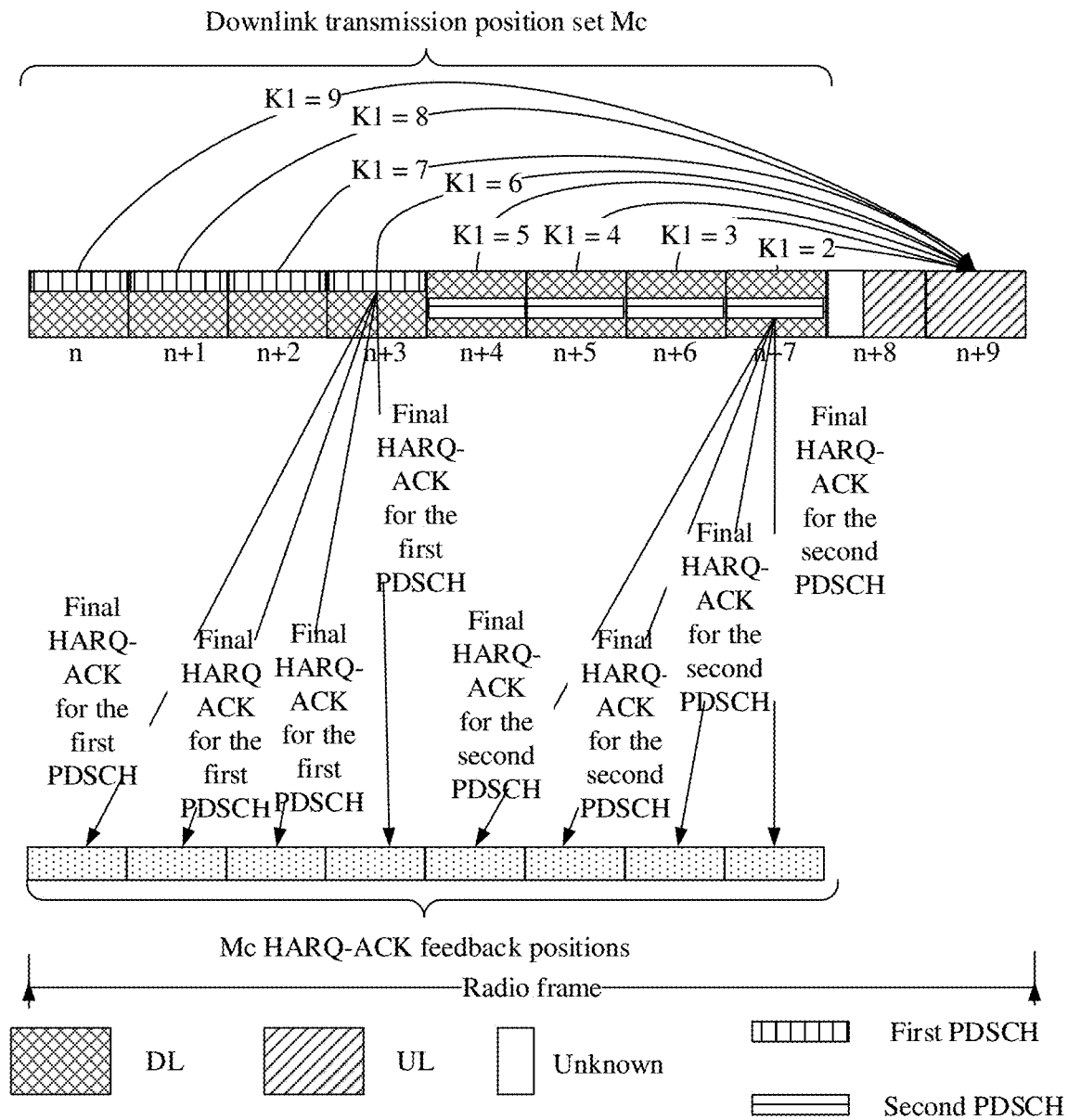
FIG. 6 is a schematic diagram of performing HARQ-ACK feedback in the third manner in the first case according to a specific embodiment of the present disclosure.

The third manner: as shown in FIG. 6, the terminal device may repetitively map final HARQ-ACK feedback information for the first PDSCH transmitted repetitively for four times to a position corresponding to each transmission of the PDSCH in the semi-static HARQ-ACK codebook. That is, the HARQ-ACK feedback information for the PDSCH in the slot n+3 that results from performing combinations for four times is separately mapped to HARQ-ACK positions corresponding to slot n to slot n+3 in the semi-static HARQ-ACK codebook. The terminal device may repetitively map final HARQ-ACK feedback information for the second PDSCH transmitted repetitively for four times to a position corresponding to each transmission of the PDSCH in the semi-static HARQ-ACK codebook. That is, the HARQ-ACK feedback information for the PDSCH in the slot n+7 that results from performing combinations for four times is separately mapped to HARQ-ACK positions corresponding to slot n+4 to slot n+7 in the semi-static HARQ-ACK codebook.

It needs to be noted that, in this case, a network side, such as a base station, determines a mapping position of HARQ-ACK corresponding to the repeated transmission of the PDSCH in the same manner, so as to obtain correct feedback information.

The second case: it is assumed that the quantity of repeated transmission of a PDSCH is 2, the first PDSCH is transmitted in a slot n for the first time and is repetitively transmitted in a subsequent slot n+1 sequentially, the second PDSCH is transmitted in a slot n+3 for the first time and is repetitively transmitted in a subsequent slot n+4 sequentially, and a third PDSCH is transmitted in a slot n+5 for the first time and is repetitively transmitted in a subsequent slot n+6 sequentially. The terminal device may perform corresponding HARQ-ACK feedbacks in the following manners.

Figure 7:
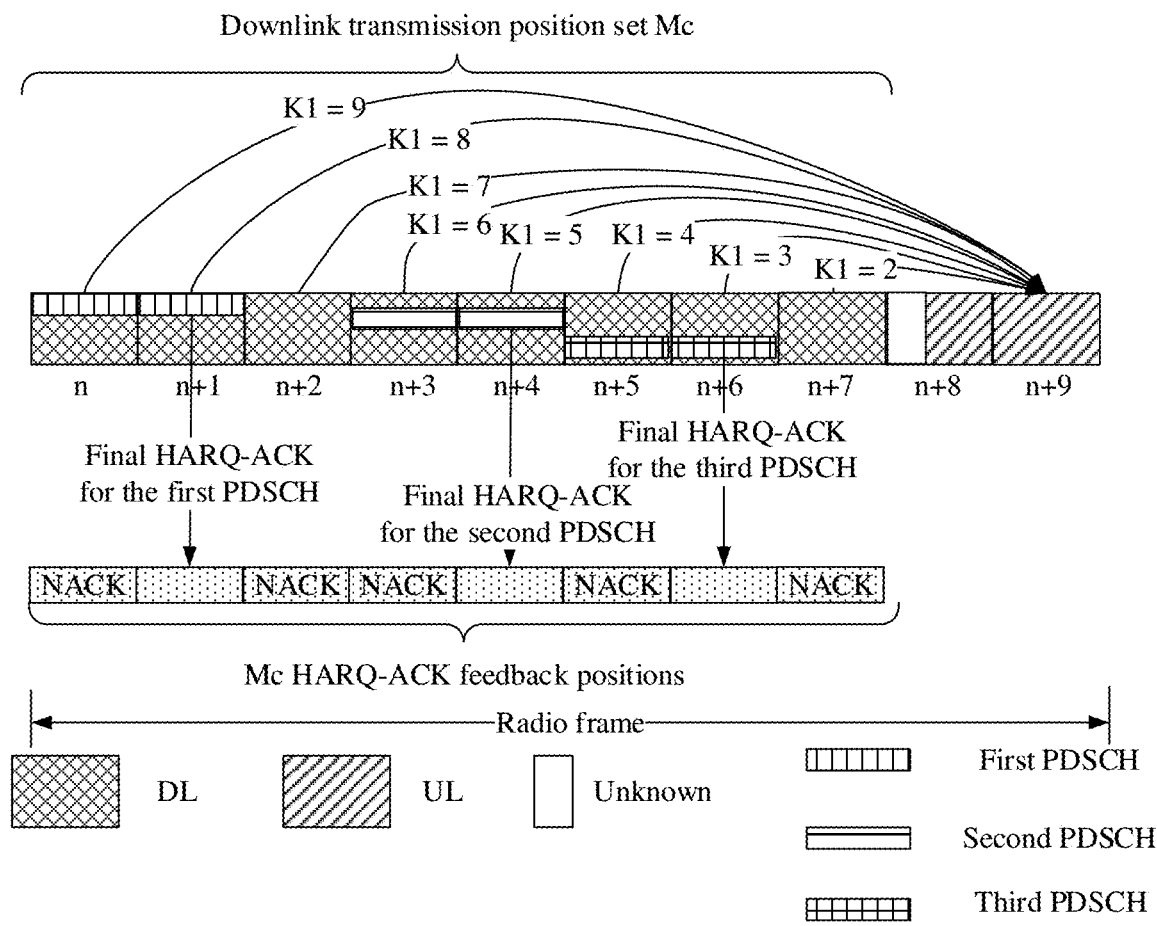
FIG. 7 is a schematic diagram of performing HARQ-ACK feedback in the first manner in the second case according to a specific embodiment of the present disclosure.

The first manner: as shown in FIG. 7, the terminal device may map final HARQ-ACK feedback information for the first PDSCH transmitted repetitively for two times to a position corresponding to the last transmission of the PDSCH in the semi-static HARQ-ACK codebook, that is, the final HARQ-ACK feedback information is transmitted at a HARQ-ACK position corresponding to a slot n+1 in the semi-static HARQ-ACK codebook. In a similar fashion, the terminal device may map final HARQ-ACK feedback information for the second PDSCH transmitted repetitively for two times to a HARQ-ACK position corresponding to a slot n+4 in the semi-static HARQ-ACK codebook for transmission, and the terminal device may map final HARQ-ACK feedback information for the third PDSCH transmitted repetitively for two times to a HARQ-ACK position corresponding to a slot n+6 in the semi-static HARQ-ACK codebook for transmission. The terminal device directly maps NACK information to other positions in the semi-static HARQ-ACK codebook.

Figure 8:
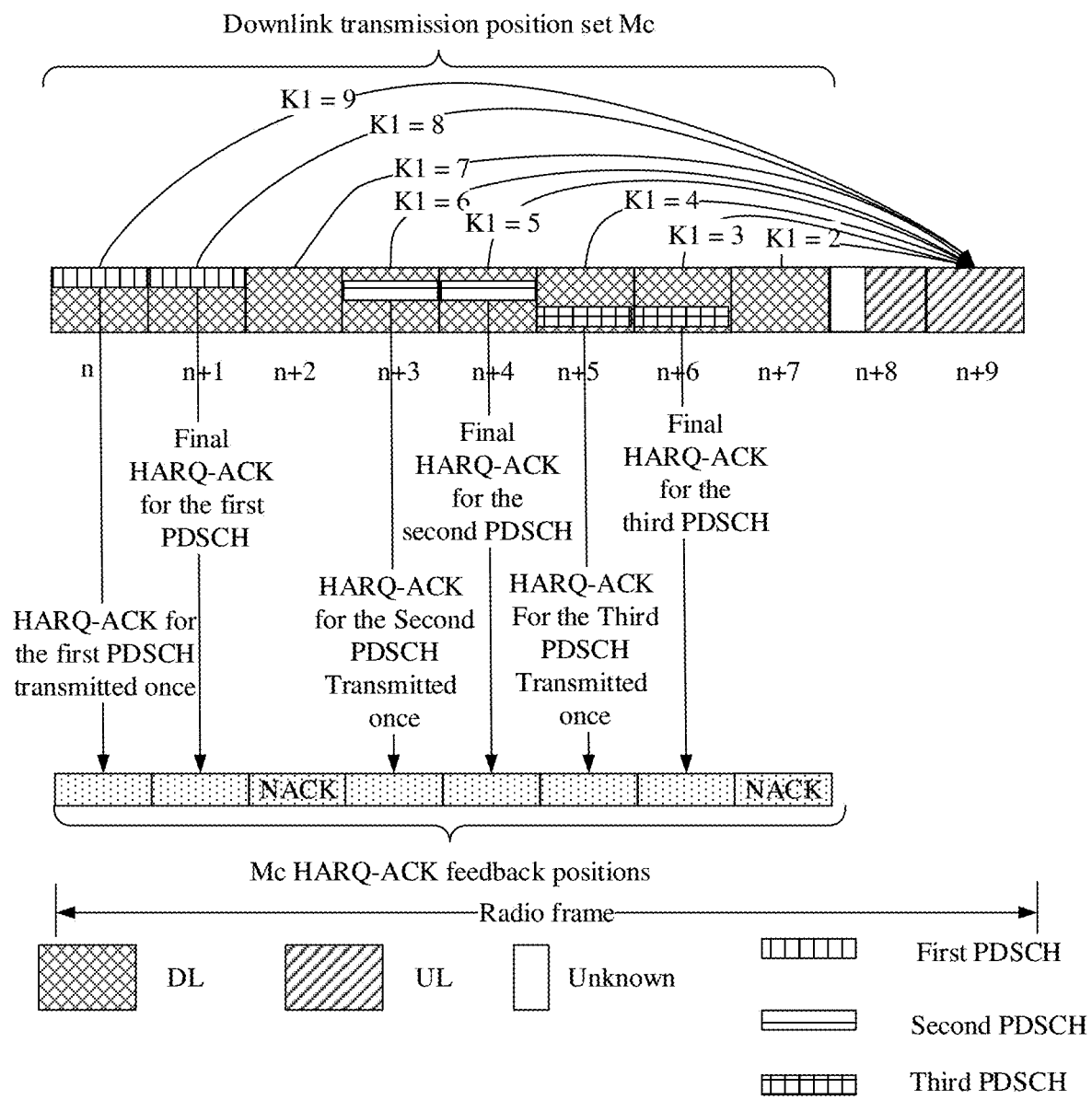
FIG. 8 is a schematic diagram of performing HARQ-ACK feedback in the second manner in the second case according to a specific embodiment of the present disclosure.

The second manner: as shown in FIG. 8, the terminal device may map final HARQ-ACK feedback information for the first PDSCH transmitted repetitively for two times to a position corresponding to the last transmission of the PDSCH in the semi-static HARQ-ACK codebook, that is, the final HARQ-ACK feedback information is transmitted at a HARQ-ACK position corresponding to a slot n+1 in the semi-static HARQ-ACK codebook. The terminal device may map the HARQ-ACK feedback information for downlink transmission other than the last transmission of the first PDSCH to a position corresponding to the downlink transmission in the semi-static HARQ-ACK codebook, that is, HARQ-ACK feedback information for the first PDSCH transmitted for the first time is mapped to a position corresponding to a slot n in the semi-static HARQ-ACK codebook. In a similar fashion, the terminal device may map final HARQ-ACK feedback information for the second PDSCH transmitted repetitively for two times to a HARQ-ACK position corresponding to a slot n+4 in the semi-static HARQ-ACK codebook, and map the HARQ-ACK feedback information for the second PDSCH transmitted for the first time to a position corresponding to a slot n+3 in the semi-static HARQ-ACK codebook; and the terminal device may map final HARQ-ACK feedback information for the third PDSCH transmitted repetitively for two times to a HARQ-ACK position corresponding to a slot n+6 in the semi-static HARQ-ACK codebook and map the HARQ-ACK feedback information for the third PDSCH transmitted for the first time to a position corresponding to a slot n+5 in the semi-static HARQ-ACK codebook. NACK information is directly mapped to other positions in the semi-static HARQ-ACK codebook because no corresponding downlink transmission is received.

Figure 9:
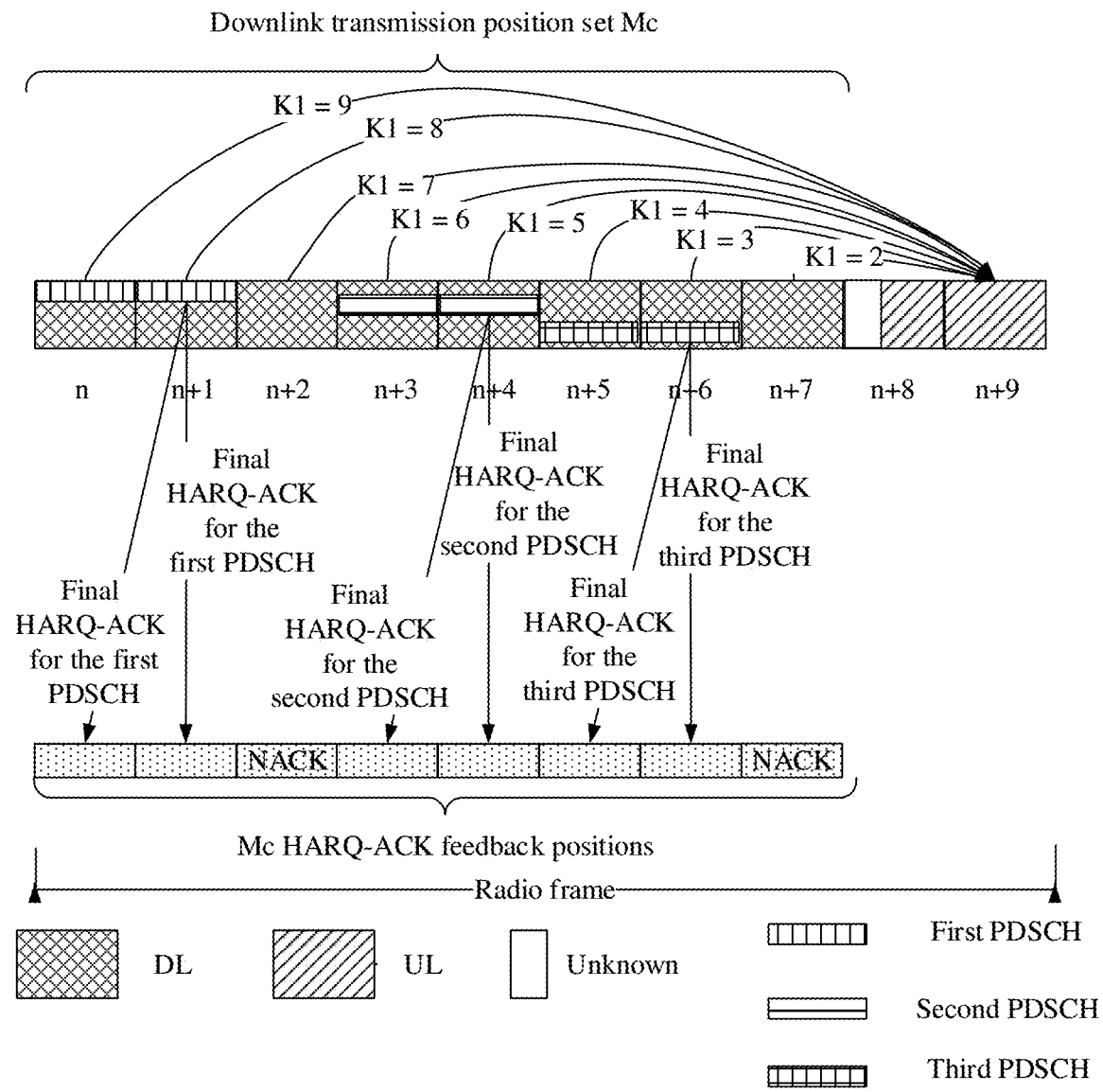
FIG. 9 is a schematic diagram of performing HARQ-ACK feedback in the third manner in the second case according to a specific embodiment of the present disclosure.

The third manner: as shown in FIG. 9, the terminal device may repetitively map final HARQ-ACK feedback information for the first PDSCH transmitted repetitively for two times to a position corresponding to each transmission of the PDSCH in the semi-static HARQ-ACK codebook. That is, the HARQ-ACK feedback information for the PDSCH in the slot n+1 that results from performing combinations for two times is separately mapped to HARQ-ACK positions corresponding to slot n and slot n+1 in the semi-static HARQ-ACK codebook. In a similar fashion, the terminal device may separately map final HARQ-ACK feedback information for the second PDSCH transmitted repetitively for two times, that is, the HARQ-ACK feedback information for the PDSCH in the slot n+4 that results from performing combinations for two times to HARQ-ACK positions corresponding to slot n+3 and slot n+4 in the semi-static HARQ-ACK codebook; and the terminal device may separately map final HARQ-ACK feedback information for the third PDSCH transmitted repetitively for two times, that is, the HARQ-ACK feedback information for the PDSCH in the slot n+6 that results from performing combinations for two times to HARQ-ACK positions corresponding to slot n+5 and slot n+6 in the semi-static HARQ-ACK codebook. NACK information is directly mapped to other positions in the semi-static HARQ-ACK codebook because no corresponding downlink transmission is received.

It needs to be noted that, in this case, a network side, such as a base station, determines a mapping position of HARQ-ACK corresponding to the repeated transmission of the PDSCH in the same manner, so as to obtain correct feedback information.

In a specific embodiment of the present disclosure, one of Mc HARQ-ACK positions corresponds to HARQ-ACK feedback information for one PDSCH. The HARQ-ACK feedback information may be one or more bits depending on a specific configuration of downlink transmission, for example, whether there is a single TB or a plurality of TB s, whether space merge is performed or whether code block group (CBG) transmission is supported.

The data transmission methods in the present disclosure are described in the foregoing embodiments. The terminal device and the network device of the present disclosure are described below with reference to the embodiments and the accompanying drawings.

Figure 10:
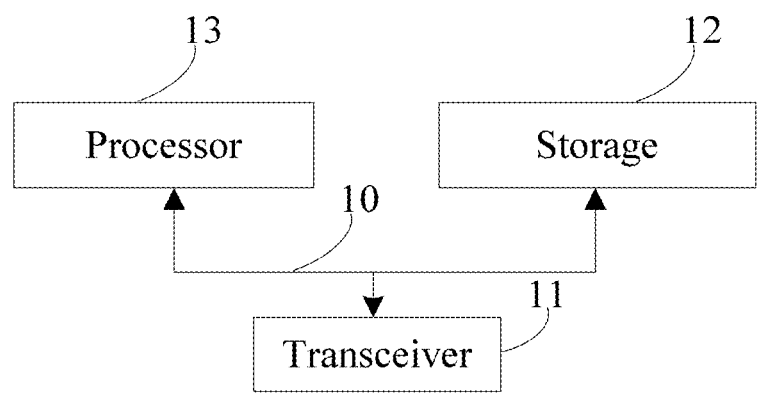
FIG. 10 is a first schematic structural diagram of a terminal device according to an embodiment of the present disclosure.

Referring to FIG. 10, the present disclosure further provides in some embodiments a terminal device, including a transceiver 11, a storage 12, a processor 13, and a computer program stored in the storage 12 and configured to be executed by the processor 13.

The transceiver 11 is configured to: receive a PDSCH, and map HARQ-ACK feedback information corresponding to a PDSCH with repetition transmissions at least to a first transmission position for transmission.

The first transmission position is a position corresponding to a last transmission of the repetition transmissions of the PDSCH in a semi-static HARQ-ACK codebook.

According to the terminal device in some embodiments of the present disclosure, it can be specified how to transmit corresponding HARQ-ACK feedback information during repeated transmission of a PDSCH, to ensure normal HARQ-ACK feedback for repeated PDSCH transmission.

In some embodiments of the present disclosure, optionally, the transceiver 11 is further configured to: map the HARQ-ACK feedback information corresponding to a PDSCH with repetition transmissions to the first transmission position for transmission, and map NACK information to a second transmission position for transmission, where the second transmission position is a position corresponding to each transmission of the repetition transmissions of the PDSCH other than the last transmission of the repetition transmissions of the PDSCH in the semi-static HARQ-ACK codebook.

Optionally, the transceiver 11 is further configured to: map the HARQ-ACK feedback information corresponding to a PDSCH with repetition transmissions to the first transmission position for transmission, and map HARQ-ACK feedback information corresponding to a current transmission of the repetition transmissions of the PDSCH to a third transmission position for transmission, where the third transmission position is a position corresponding to the current transmission of the repetition transmissions of the PDSCH in the semi-static HARQ-ACK codebook.

Optionally, the transceiver 11 is further configured to repetitively map the HARQ-ACK feedback information corresponding to a PDSCH with repetition transmissions to a position corresponding to each transmission of the repetition transmissions of the PDSCH in the semi-static HARQ-ACK codebook for transmission.

Optionally, the HARQ-ACK feedback information corresponding to a PDSCH with repetition transmissions is HARQ-ACK feedback information corresponding to the last transmission of the repetition transmissions of the PDSCH.

Optionally, the transceiver 11 is further configured to map NACK information to a position other than the position corresponding to each transmission of the repetition transmissions of the PDSCH in the semi-static HARQ-ACK codebook for transmission.

In FIG. 10, a bus architecture (represented by a bus 10) is illustrated, the bus 10 may include any quantity of interconnected buses and bridges. The bus 10 links together various circuits including one or more processors represented by the processor 13 and a storage represented by the storage 12. The transceiver 11 may include a transmitter and a receiver. The transmitter and the receiver may be connected to the processor 13 and the storage 12 by the bus 10.

The processor 13 is responsible for managing the bus 10 and general processing. The storage 12 is configured to store data used by the processor 13 while performing operations.

Figure 11:
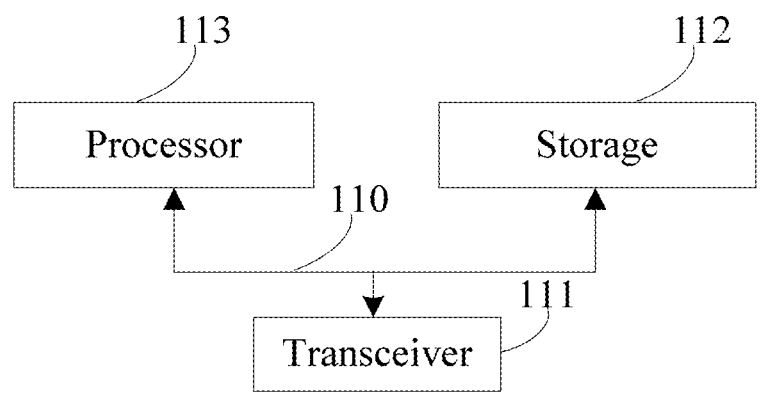
FIG. 11 is a first schematic structural diagram of a network device according to an embodiment of the present disclosure.

Referring to FIG. 11, the present disclosure further provides in some embodiments a network device, including a transceiver 111, a storage 112, a processor 113, and a computer program stored in the storage 112 and configured to be executed by the processor 113.

The transceiver 111 is configured to: transmit a PDSCH, and receive HARQ-ACK feedback information corresponding to a PDSCH with repetition transmissions at least at a first transmission position.

The first transmission position is a position corresponding to a last transmission of the repetition transmissions of the PDSCH in a semi-static HARQ-ACK codebook.

According to the network device in the embodiment of the present disclosure, it can be specified how to receive corresponding HARQ-ACK feedback information during repeated transmission of a PDSCH, to ensure normal HARQ-ACK feedback for repeated PDSCH transmission, to obtain correct feedback information.

In some embodiments of the present disclosure, optionally, the transceiver 111 is further configured to: receive the HARQ-ACK feedback information corresponding to a PDSCH with repetition transmissions at the first transmission position, and receive NACK information at a second transmission position, where the second transmission position is a position corresponding to each transmission of the repetition transmissions of the PDSCH other than the last transmission of the repetition transmissions of the PDSCH in the semi-static HARQ-ACK codebook.

Optionally, the transceiver 111 is further configured to: receive the HARQ-ACK feedback information corresponding to a PDSCH with repetition transmissions at the first transmission position, and receive HARQ-ACK feedback information corresponding to a current transmission of the repetition transmissions of the PDSCH at a third transmission position, where the third transmission position is a position corresponding to the current transmission of the repetition transmissions of the PDSCH in the semi-static HARQ-ACK codebook.

Optionally, the transceiver 111 is further configured to receive the HARQ-ACK feedback information corresponding to a PDSCH with repetition transmissions at a position corresponding to each transmission of the repetition transmissions of the PDSCH in the semi-static HARQ-ACK codebook.

Optionally, the HARQ-ACK feedback information corresponding to a PDSCH with repetition transmissions is HARQ-ACK feedback information corresponding to the last transmission of the repetition transmissions of the PDSCH.

Optionally, the transceiver 111 is further configured to receive NACK information at a position other than a position corresponding to each transmission of the repetition transmissions of the PDSCH in the semi-static HARQ-ACK codebook.

In FIG. 11, a bus architecture (represented by a bus 110) is illustrated, the bus 110 may include any quantity of interconnected buses and bridges. The bus 110 links together various circuits including one or more processors represented by the processor 113 and a storage represented by the storage 112. The transceiver 111 may include a transmitter and a receiver. The transmitter and the receiver may be connected to the processor 113 and the storage 112 by the bus 110.

The processor 113 is responsible for managing the bus 110 and general processing. The storage 112 is configured to store data used by the processor 113 while performing operations.

Figure 12:
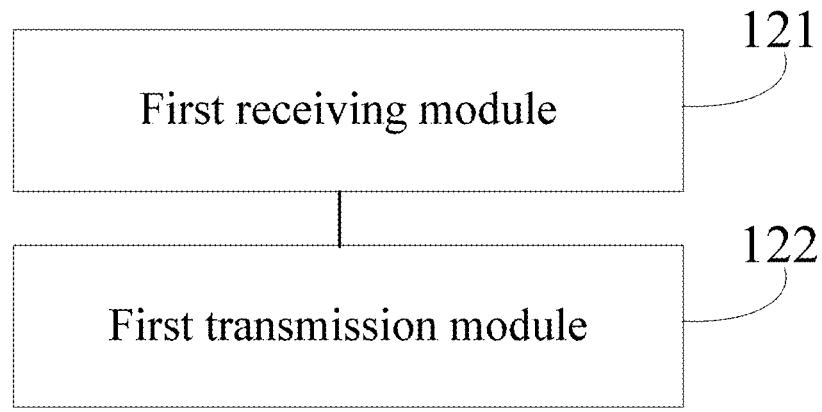
FIG. 12 is a first schematic structural diagram of a data transmission apparatus according to an embodiment of the present disclosure.

Referring to FIG. 12, the present disclosure further provides in some embodiments a data transmission apparatus. The data transmission apparatus is applied to a terminal device, and includes:

a first receiving module 121, configured to receive a PDSCH; and a first transmission module 122, configured to map HARQ-ACK feedback information corresponding to a PDSCH with repetition transmissions at least to a first transmission position for transmission, where the first transmission position is a position corresponding to a last transmission of the repetition transmissions of the PDSCH in a semi-static HARQ-ACK codebook.

In the data transmission apparatus in some embodiments of the present disclosure, it can specified how to transmit corresponding HARQ-ACK feedback information during repeated transmission of a PDSCH, to ensure normal HARQ-ACK feedback for repeated PDSCH transmission.

In some embodiments of the present disclosure, optionally, the first transmission module 122 is further configured to: map the HARQ-ACK feedback information corresponding to a PDSCH with repetition transmissions to the first transmission position for transmission, and map NACK information to a second transmission position for transmission, where the second transmission position is a position corresponding to each transmission of the repetition transmissions of the PDSCH other than the last transmission of the repetition transmissions of the PDSCH in the semi-static HARQ-ACK codebook.

Optionally, the first transmission module 122 is further configured to: map the HARQ-ACK feedback information corresponding to a PDSCH with repetition transmissions to the first transmission position for transmission, and map HARQ-ACK feedback information corresponding to a current transmission of the repetition transmissions of the PDSCH to a third transmission position for transmission, where the third transmission position is a position corresponding to the current transmission of the repetition transmissions of the PDSCH in the semi-static HARQ-ACK codebook.

Optionally, the first transmission module 122 is further configured to repetitively map the HARQ-ACK feedback information corresponding to a PDSCH with repetition transmissions to a position corresponding to each transmission of the repetition transmissions of the PDSCH in the semi-static HARQ-ACK codebook for transmission.

Optionally, the HARQ-ACK feedback information corresponding to a PDSCH with repetition transmissions is HARQ-ACK feedback information corresponding to the last transmission of the repetition transmissions of the PDSCH.

Optionally, the terminal device further includes:

a third transmission module, configured to map NACK information to a position other than a position corresponding to each transmission of the repetition transmissions of the PDSCH in the semi-static HARQ-ACK codebook for transmission.

Figure 13:
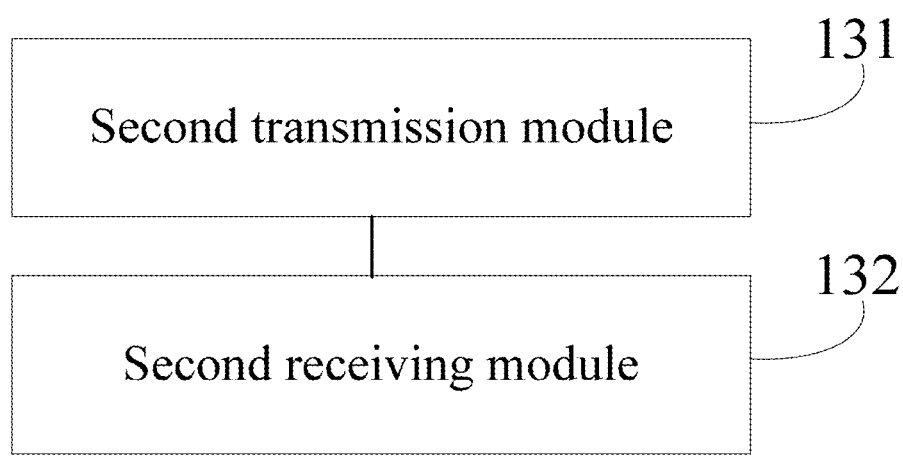
FIG. 13 is a second schematic structural diagram of a data transmission apparatus according to an embodiment of the present disclosure.

Referring to FIG. 13, the present disclosure further provides in some embodiments a data transmission apparatus. The data transmission apparatus is applied to a network device, and includes:

a second transmission module 131, configured to transmit a PDSCH; and a second receiving module 132, configured to receive HARQ-ACK feedback information corresponding to a PDSCH with repetition transmissions at least at a first transmission position, where the first transmission position is a position corresponding to a last transmission of the repetition transmissions of the PDSCH in a semi-static HARQ-ACK codebook.

In the data transmission apparatus in some embodiments of the present disclosure, it can specified how to transmit corresponding HARQ-ACK feedback information during repeated transmission of a PDSCH, to ensure normal HARQ-ACK feedback for repeated PDSCH transmission, to obtain correct feedback information.

In some embodiments of the present disclosure, optionally, the second receiving module 132 is further configured to: receive HARQ-ACK feedback information corresponding to a PDSCH with repetition transmissions at the first transmission position, and receive NACK information at a second transmission position, where the second transmission position is a position corresponding to each transmission of the repetition transmissions of the PDSCH other than the last transmission of the repetition transmissions of the PDSCH in the semi-static HARQ-ACK codebook.

Optionally, the second receiving module 132 is further configured to: receive the HARQ-ACK feedback information corresponding to a PDSCH with repetition transmissions at the first transmission position, and receive HARQ-ACK feedback information corresponding to a current transmission of the repetition transmissions of the PDSCH at a third transmission position, where the third transmission position is a position corresponding to the current transmission of the repetition transmissions of the PDSCH in the semi-static HARQ-ACK codebook.

Optionally, the second receiving module 132 is further configured to receive the HARQ-ACK feedback information corresponding to a PDSCH with repetition transmissions at a position corresponding to each transmission of the repetition transmissions of the PDSCH in the semi-static HARQ-ACK codebook.

Optionally, the HARQ-ACK feedback information corresponding to a PDSCH with repetition transmissions is HARQ-ACK feedback information corresponding to the last transmission of the repetition transmissions of the PDSCH.

Optionally, the network device may further include:

a third receiving module, configured to receive the NACK information at a position other than the position corresponding to each transmission of the repetition transmissions of the PDSCH in the semi-static HARQ-ACK codebook.

In addition, the present disclosure further provides in some embodiments a terminal device, including a processor, a storage, and a computer program stored in the storage and executable on the processor. The computer program is configured to be executed by the processor to implement various processes in the embodiments of the foregoing data transmission method applied to a terminal device, and can achieve the same technical effects. To avoid repetition, details are not described herein again.

Figure 14:
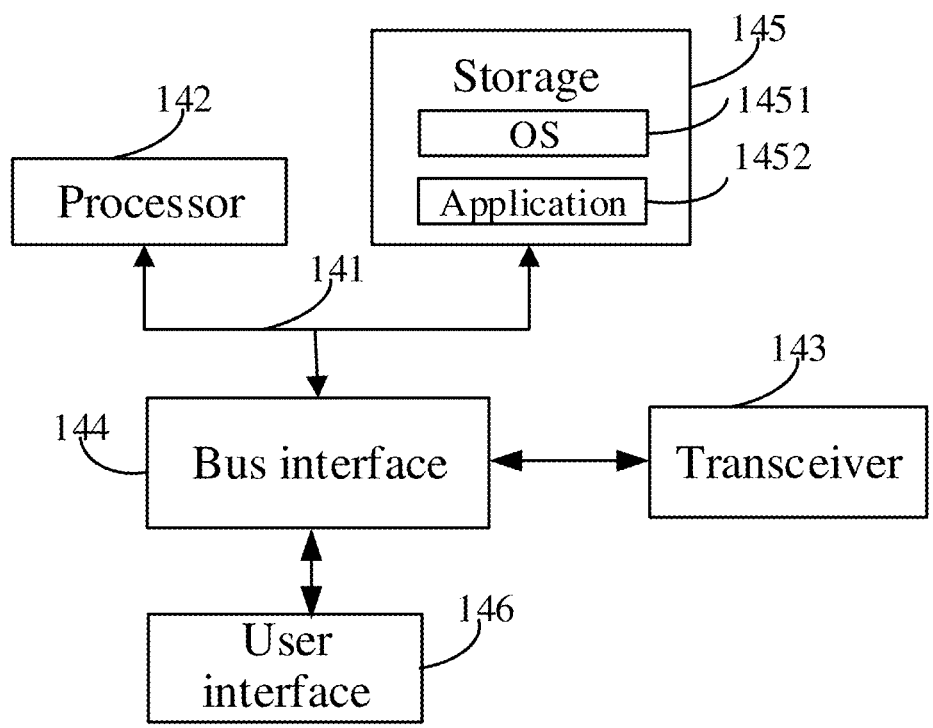
FIG. 14 is a second schematic structural diagram of a terminal device according to an embodiment of the present disclosure.

Specifically, referring to FIG. 14, the present disclosure further provides in some embodiments a terminal device, including a bus 141, a processor 142, a transceiver 143, a bus interface 144, a storage 145, and a user interface 146.

The processor 142 is configured to read a program in the storage 145 to perform the following steps:

controlling the transceiver 143 to receive a PDSCH, and map HARQ-ACK feedback information corresponding to a PDSCH with repetition transmissions at least to a first transmission position for transmission, where the first transmission position is a position corresponding to a last transmission of the repetition transmissions of the PDSCH in a semi-static HARQ-ACK codebook.

The transceiver 143 is configured to receive and transmit data under the control of the processor 142.

In FIG. 14, a bus architecture (represented by the bus 141) is illustrated, the bus 141 may include any quantity of interconnected buses and bridges. The bus 141 links together various circuits including one or more processors represented by the processor 142 and a storage represented by the storage 145. The bus 141 may also link various other circuits such as peripherals, voltage regulators, and power management circuits, which are well known in the art, and therefore are not further described herein. The bus interface 144 provides an interface between the bus 141 and the transceiver 143. The transceiver 143 may be one element or may be a plurality of elements, for example, a plurality of receivers and a plurality of transmitters, to provide units for communicating with various other apparatuses over a transmission medium. For example, the transceiver 143 receives external data from another device. The transceiver 143 is configured to transmit data processed by the processor 142 to another device. Depending on the nature of a computing system, the user interface 146 such as a keypad, a display, a speaker, a microphone, and a joystick may further be provided.

The processor 142 is responsible for managing the bus 141 and general processing, for example, running the general-purpose operation system (OS). The storage 145 is configured to store data used by the processor 142 while performing operations.

Optionally, the processor 142 may be a central processing unit (CPU), an application-specific integrated circuit (ASIC), a field-programmable gate array (FPGA) or a complex programmable logic device (CPLD).

It may be understood that the storage 145 in some embodiments of the present disclosure may be a volatile storage or a nonvolatile storage or may include both a volatile storage and a nonvolatile storage. The nonvolatile storage may be a read-only memory (ROM), a programmable read-only memory (PROM), an erasable programmable read-only memory (EPROM), an electrically erasable programmable read-only memory (EEPROM) or a flash memory. The volatile storage may be a random access memory (RAM) used as an external cache. By way of example rather than limitation, many forms of RAMs such as a static random access memory (SRAM), a dynamic random access memory (DRAM), a synchronous dynamic random access memory (SDRAM), a double-data-rate SDRAM (DDRSDRAM), an enhanced SDRAM (ESDRAM), a synchlink DRAM (SLDRAM), and a Direct Rambus RAM (DRRAM) may be used. The storage 145 of the system and method described herein is intended to include, but not limited to, these and any other appropriate types of storages.

In some implementations, the storage 145 stores the following elements, executable modules or data structures, or a subset thereof, or an extend set thereof: an OS 1451 and an application 1452.

The OS 1451 includes various system programs such as a framework layer, a core library layer, and a driver layer, and is configured to implement various basis services and process hardware-based tasks. The application 1452 includes various applications such as a media player or a browser, and is configured to implement various application services. A program for implementing the method provided in the embodiments of the present disclosure may be included in the application 1452.

The present disclosure further provides in some embodiments a network device, including a processor, a storage, and a computer program stored in the storage and executable on the processor. The computer program is configured to be executed by the processor to implement various processes in the embodiments of the foregoing data transmission method applied to a network device, and can achieve the same technical effects. To avoid repetition, details are not described herein again.

Figure 15:
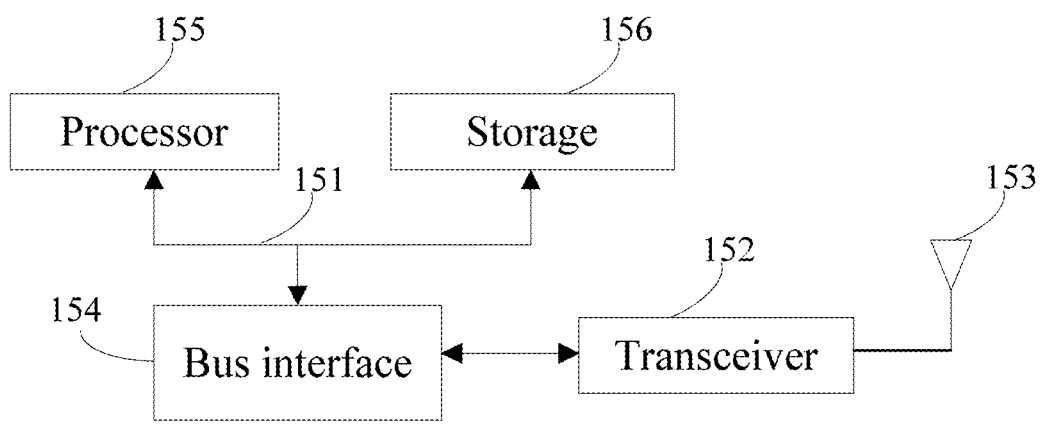
FIG. 15 is a second schematic structural diagram of a network device according to an embodiment of the present disclosure.

Specifically, referring to FIG. 15, the present disclosure further provides in some embodiments a network device, including a bus 151, a transceiver 152, an antenna 153, a bus interface 154, a processor 155, and a storage 156.

In some embodiments of the present disclosure, the network device further includes a computer program stored in the storage 156 and configured to be executed by the processor 155. The processor 155 is configured to execute the computer program to implement the following steps:

controlling the transceiver 152 to transmit a PDSCH, and receive HARQ-ACK feedback information corresponding to a PDSCH with repetition transmissions at least at a first transmission position, where the first transmission position is a position corresponding to a last transmission of the repetition transmissions of the PDSCH in a semi-static HARQ-ACK codebook.

The transceiver 152 is configured to receive and transmit data under the control of the processor 155.

In FIG. 15, a bus architecture (represented by the bus 151) is illustrated, the bus 151 may include any quantity of interconnected buses and bridges. The bus 151 links together various circuits including one or more processors represented by the processor 155 and a storage represented by the storage 156. The bus 151 may also link various other circuits such as peripherals, voltage regulators, and power management circuits, which are well known in the art, and therefore are not further described herein. The bus interface 154 provides an interface between the bus 151 and the transceiver 152. The transceiver 152 may be one element or may be a plurality of elements, for example, a plurality of receivers and a plurality of transmitters, to provide units for communicating with various other apparatuses over a transmission medium. The data processed by the processor 155 is transmitted over a wireless medium by using the antenna 153. Further, the antenna 153 receives data and transfers the data to the processor 155.

The processor 155 is responsible for managing the bus 151 and general processing, and may further provide various functions, include timing, peripheral interfaces, voltage regulation, power management, and other control functions. The storage 156 is configured to store data used by the processor 155 while performing operations.

Optionally, processor 155 may be a CPU, an ASIC, an FPGA or a CPLD.

The present disclosure further provides in some embodiments a computer-readable storage medium, storing therein a computer program. The computer program is configured to be executed by a processor to implement various processes of the embodiments of the foregoing data transmission method applied to a terminal device, and can achieve the same technical effects. To avoid repetition, details are not described herein again.

The present disclosure further provides in some embodiments a computer-readable storage medium, storing therein a computer program. The computer program is configured to be executed by a processor to implement various processes of the embodiments of the foregoing data transmission method applied to a network device, and can achieve the same technical effects. To avoid repetition, details are not described herein again.

The computer-readable storage medium includes a permanent or non-permanent medium and a removable or non-removable medium, and may implement information storage by using any method or technology. The information may be a computer-readable instruction, a data structure, a program module or other data. An example of the computer-readable storage medium includes, but is not limited to, a phase-change random access memory (PRAM), an SRAM, a DRAM, another type of RAM, a ROM, an EEPROM, a flash memory or another memory technology, a compact disc read-only memory (CD-ROM), a digital versatile disc (DVD) or another optical storage, a cassette tape, a magnetic tape, a magnetic disk storage or another magnetic storage device or any another non-transmission medium, that may be configured to store information accessible by a computing device. According to the definitions herein, the computer-readable storage medium does not include a transitory computer-readable storage medium, for example, a modulated data signal and carrier.

It should be noted that the terms "include", "including", or any variation thereof herein are intended to cover a non-exclusive inclusion, such that a process, a method, an article, or a device that includes a list of elements not only includes the list of elements, but also may include other elements not expressly listed or include elements inherent to the process, the method, the article, or the device. In case that there is no further limitation, an element preceded by "includes or including" does not preclude existence of additional identical elements in the process, the method, the article, or the device including the element.

The sequence numbers in embodiments of the present disclosure are merely for the convenience of description, and do not imply a preference among the embodiments.

From the foregoing description of the embodiments, a person skilled in the art will clearly appreciate that the methods according to the embodiments may be implemented not only by software in conjunction with necessary generic hardware platform, but also by hardware, although the former will be preferred in most cases. Based on such an understanding, essential parts, or parts contributing to the related art, of the technical solution of the present disclosure may be implemented in form of a software product. The computer software product is stored in a storage medium (e.g., an ROM/RAM, a magnetic disk and an optical disc) and includes several instructions configured to be executed by a terminal device (such as a handset, a computer, a server, an air conditioner or a network device) to perform the method according to the embodiments of the present disclosure.

The aforementioned are merely specific implementations of the present disclosure, but the scope of the disclosure is by no means limited thereto. Any modifications or replacements that would easily occurred to those skilled in the art, without departing from the technical scope disclosed in the disclosure, should be encompassed in the scope of the present disclosure. Therefore, the scope of the present disclosure is to be determined by the scope of the claims.

What is claimed is:

1. A data transmission method, applied to a terminal device, comprising:

receiving a physical downlink shared channel (PDSCH); and mapping hybrid automatic repeat request acknowledgement (HARQ-ACK) feedback information corresponding to repeated transmissions of the PDSCH at least to a first target transmission position in a semi-static HARQ-ACK codebook for transmission, wherein the repeated transmissions of the PDSCH carry identical data, wherein the first target transmission position in the semi-static HARQ-ACK codebook is a position corresponding to a last transmission of the repeated transmissions of the PDSCH;

wherein the mapping the HARQ-ACK feedback information corresponding to the repeated transmissions of the PDSCH at least to the first target transmission position for transmission comprises:

mapping the HARQ-ACK feedback information corresponding to the repeated transmissions of the PDSCH to the first target transmission position for transmission, and mapping negative acknowledgement (NACK) information to a second target transmission position for transmission, wherein the second target transmission position is a position in the semi-static HARQ-ACK codebook that corresponds to each transmission of the repeated transmissions of the PDSCH other than the last transmission of the repeated transmissions of the PDSCH;

or, mapping the HARQ-ACK feedback information corresponding to the repeated transmissions of the PDSCH to the first target transmission position for transmission, and mapping HARQ-ACK feedback information corresponding to a current transmission of the repeated transmissions of the PDSCH to a third target transmission position for transmission, wherein the third target transmission position is a position in the semi-static HARQ-ACK codebook that corresponds to the current transmission of the repeated transmissions of the PDSCH.

2. The data transmission method according to claim 1, further comprising:
mapping negative acknowledgement (NACK) information to a position in the semi-static HARQ-ACK codebook that is other than a position corresponding to each transmission of the repeated transmissions of the PDSCH for transmission.

3. A data transmission method, applied to a network device, comprising:
transmitting a physical downlink shared channel (PDSCH); and
receiving hybrid automatic repeat request acknowledgement (HARQ-ACK) feedback information corresponding to repeated transmissions of the PDSCH at least at a first target transmission position in a semi-static HARQ-ACK codebook, wherein the repeated transmissions of the PDSCH carry identical data,
wherein the first target transmission position in the semi-static HARQ-ACK codebook is a position corresponding to a last transmission of the repeated transmissions of the PDSCH;
wherein the receiving the HARQ-ACK feedback information corresponding to the repeated transmissions of the PDSCH at least at the first target transmission position comprises:
receiving the HARQ-ACK feedback information corresponding to the repeated transmissions of the PDSCH at the first target transmission position, and receiving negative acknowledgement (NACK) information at a second target transmission position,
wherein the second target transmission position is a position in the semi-static HARQ-ACK codebook that corresponds to each transmission of the repeated transmissions of the PDSCH other than the last transmission of the repeated transmissions of the PDSCH;
or,
receiving the HARQ-ACK feedback information corresponding to the repeated transmissions of the PDSCH at the first target transmission position, and receiving HARQ-ACK feedback information corresponding to a current transmission of the repeated transmissions of the PDSCH at a third target transmission position,
wherein the third target transmission position is a position in the semi-static HARQ-ACK codebook that corresponds to the current transmission of the repeated transmissions of the PDSCH.

4. The data transmission method according to claim 3, further comprising:
receiving negative acknowledgement (NACK) information at a position in the semi-static HARQ-ACK codebook that is other than a position corresponding to each transmission of the repeated transmissions of the PDSCH.

5. A terminal device, comprising a storage, a processor, and a computer program stored in the storage and configured to be executed by the processor, wherein the processor is configured to execute the computer program to implement a data transmission method, and the data transmission method comprises:
receiving a physical downlink shared channel (PDSCH); and
mapping hybrid automatic repeat request acknowledgement (HARQ-ACK) feedback information corresponding to repeated transmissions of the PDSCH at least to a first target transmission position in a semi-static HARQ-ACK codebook for transmission, wherein the repeated transmissions of the PDSCH carry identical data,
wherein the first target transmission position in the semi-static HARQ-ACK codebook is a position corresponding to a last transmission of the repeated transmissions of the PDSCH;
wherein the processor is further configured to execute the computer program to implement following steps:
mapping the HARQ-ACK feedback information corresponding to the repeated transmissions of the PDSCH to the first target transmission position for transmission, and mapping negative acknowledgement (NACK) information to a second target transmission position for transmission,
wherein the second target transmission position is a position in the semi-static HARQ-ACK codebook that corresponds to each transmission of the repeated transmissions of the PDSCH other than the last transmission of the repeated transmissions of the PDSCH;
or,
mapping the HARQ-ACK feedback information corresponding to the repeated transmissions of the PDSCH to the first target transmission position for transmission, and mapping HARQ-ACK feedback information corresponding to a current transmission of the repeated transmissions of the PDSCH to a third target transmission position for transmission,
wherein the third target transmission position is a position in the semi-static HARQ-ACK codebook that corresponds to the current transmission of the repeated transmissions of the PDSCH.

6. The terminal device according to claim 5, wherein the processor is further configured to execute the computer program to implement following step:
mapping negative acknowledgement (NACK) information to a position in the semi-static HARQ-ACK codebook that is other than a position corresponding to each transmission of the repeated transmissions of the PDSCH for transmission.

7. A network device, comprising a storage, a processor, and a computer program stored in the storage and configured to be executed by the processor, wherein the processor is configured to execute the computer program to implement a data transmission method, and the data transmission method comprises:
transmitting a physical downlink shared channel (PDSCH); and
receiving hybrid automatic repeat request acknowledgement (HARQ-ACK) feedback information corresponding to repeated transmissions of the PDSCH at least at a first target transmission position in a semi-static HARQ-ACK codebook, wherein the repeated transmissions of the PDSCH carry identical data,
wherein the first target transmission position in the semi-static HARQ-ACK codebook is a position corresponding to a last transmission of the repeated transmissions of the PDSCH;
wherein the processor is further configured to execute the computer program to implement following steps:
receiving the HARQ-ACK feedback information corresponding to the repeated transmissions of the PDSCH at the first target transmission position, and receiving negative acknowledgement (NACK) information at a second target transmission position, wherein the second target transmission position is a position in the semi-static HARQ-ACK codebook that corresponds to each transmission of the repeated transmissions of the PDSCH other than the last transmission of the repeated transmissions of the PDSCH;

or, receiving the HARQ-ACK feedback information corresponding to the repeated transmissions of the PDSCH at the first target transmission position, and receiving HARQ-ACK feedback information corresponding to a current transmission of the repeated transmissions of the PDSCH at a third target transmission position, wherein the third target transmission position is a position in the semi-static HARQ-ACK codebook that corresponds to the current transmission of the repeated transmissions of the PDSCH.

8. The network device according to claim 7, wherein the processor is further configured to execute the computer program to implement following step:

receiving negative acknowledgement (NACK) information at a position in the semi-static HARQ-ACK codebook that is other than a position corresponding to each transmission of the repeated transmissions of the PDSCH.

* * * * *